United States Patent
Fukuchi et al.

(10) Patent No.: US 11,134,121 B2
(45) Date of Patent: Sep. 28, 2021

(54) METHOD AND SYSTEM FOR RECOVERING DATA IN DISTRIBUTED COMPUTING SYSTEM

(71) Applicant: HITACHI, LTD., Tokyo (JP)

(72) Inventors: Kaiho Fukuchi, Tokyo (JP); Jun Nemoto, Tokyo (JP); Masakuni Agetsuma, Tokyo (JP)

(73) Assignee: HITACHI, LTD., Tokyo (JP)

( * ) Notice: Subject to any disclaimer, the term of this patent is extended or adjusted under 35 U.S.C. 154(b) by 245 days.

(21) Appl. No.: 15/920,501

(22) Filed: Mar. 14, 2018

(65) Prior Publication Data

US 2019/0020716 A1    Jan. 17, 2019

(30) Foreign Application Priority Data

Jul. 12, 2017    (JP) .............................. JP2017-136209

(51) Int. Cl.
*H04L 29/08* (2006.01)
*H04L 29/06* (2006.01)
(Continued)

(52) U.S. Cl.
CPC ...... *H04L 67/1095* (2013.01); *G06F 11/1469* (2013.01); *G06F 11/2025* (2013.01);
(Continued)

(58) Field of Classification Search
None
See application file for complete search history.

(56) References Cited

U.S. PATENT DOCUMENTS

| | | | |
|---|---|---|---|
| 2009/0106510 A1* | 4/2009 | Fujihara | G06F 3/0605 711/154 |
| 2012/0084383 A1 | 4/2012 | Bernbo et al. | |

(Continued)

FOREIGN PATENT DOCUMENTS

| | | |
|---|---|---|
| JP | 2010-225021 A | 10/2010 |
| JP | 2013-525895 A | 6/2013 |
| JP | 2015-529861 A | 10/2015 |

OTHER PUBLICATIONS

Chun et al. "Efficient Replica Maintenance for Distributed Storage Systems", NSDI'06: 3rd Symposium on NSDI, vol. 3, pp. 45-58, May 2006 [retrieved on Feb. 10, 2020], Retrieved from the Internet: <URL: https://www.usenix.org/legacy/events/nsdi06/tech/full_papers/chun.pdf>. (Year: 2006).*

*Primary Examiner* — Kevin T Bates
*Assistant Examiner* — Dae Kim
(74) *Attorney, Agent, or Firm* — Mattingly & Malur, PC

(57) ABSTRACT

The time required for recovery in a distributed computing system can be reduced. At least one node (for example a server) or a different computer (for example a management server) are provided in the distributed computing system which includes a plurality of nodes existing at a plurality of sites. One or more sites at which one or more nodes that hold one or more datasets identical to one or more datasets held by a node to be recovered are identified. For the recovery, it is determined, on the basis of the one or more identified sites, a restore destination site that is a site of a node to which the one or more identical datasets are to be restored from among the plurality of sites.

4 Claims, 21 Drawing Sheets

(51) Int. Cl.
 *G06F 11/20* (2006.01)
 *G06F 11/14* (2006.01)
 *H04L 12/26* (2006.01)

(52) U.S. Cl.
 CPC ...... *G06F 11/2028* (2013.01); *H04L 43/0811* (2013.01); *H04L 67/42* (2013.01); *G06F 11/203* (2013.01); *G06F 11/2094* (2013.01)

(56) References Cited

U.S. PATENT DOCUMENTS

| | | | | |
|---|---|---|---|---|
| 2013/0226873 | A1* | 8/2013 | Ogata | G06F 11/1453 707/640 |
| 2014/0081919 | A1* | 3/2014 | Matsumoto | G06F 11/1464 707/652 |
| 2014/0143207 | A1* | 5/2014 | Brewer | G06F 16/3346 707/634 |
| 2015/0113324 | A1* | 4/2015 | Factor | G06F 16/245 714/20 |
| 2017/0262345 | A1* | 9/2017 | Wang | G06F 11/2094 |
| 2017/0338957 | A1* | 11/2017 | Ateniese | H04L 9/0894 |
| 2018/0323962 | A1* | 11/2018 | Yanagisawa | G06F 21/64 |

\* cited by examiner

FIG. 4

400 Server information

| Server ID (410) | Participating channel ID list (420) | Site ID (430) |
|---|---|---|
| 1001 | A | 6001 |
| 1002 | A, B | 6002 |
| 1003 | A, B, C | 6003 |
| 1004 | C, D | 6004 |
| 1005 | C, D, E | 6005 |
| 1006 | E | 6006 |
| ... | ... | |

FIG. 5

500 — Total sum data amount information

| Channel ID (510) | Total sum data amount (520) |
|---|---|
| A | 100 TB |
| B | 20 TB |
| C | 30 TB |
| D | 40 TB |
| E | 50 TB |
| ... | ... |

FIG. 6

Inter-site communication speed information (600)

| | 6001 | 6002 | 6003 | 6004 | 6005 | 6006 | ... |
|---|---|---|---|---|---|---|---|
| 6001 | 128 MB/s | 10 MB/s | 5 MB/s | 2.5 MB/s | 2 MB/s | 1 MB/s | ... |
| 6002 | - | 128 MB/s | 10 MB/s | 5 MB/s | 2.5 MB/s | 2 MB/s | ... |
| 6003 | - | - | 128 MB/s | 10 MB/s | 5 MB/s | 2.5 MB/s | ... |
| 6004 | - | - | - | 128 MB/s | 10 MB/s | 5 MB/s | ... |
| 6005 | - | - | - | - | 128 MB/s | 10 MB/s | ... |
| 6006 | - | - | - | - | - | 128 MB/s | ... |
| ... | ... | ... | ... | ... | ... | | ... |

FIG. 16

Server information (1600)

| Server ID (1610) | Minimum hash value (1620) | Maximum hash value (1630) | Site ID (1640) | Server type (1650) |
|---|---|---|---|---|
| 1001 | 00000000 | 44444444 | 6001 | Master |
| 1002 | 55555555 | 88888888 | 6002 | Master |
| 1003 | 99999999 | CCCCCCCC | 6003 | Master |
| 1004 | DDDDDDDD | FFFFFFFF | 6004 | Master |
| 1005 | - | - | 6005 | Replica |
| 1006 | - | - | 6006 | Replica |
| 1007 | - | - | 6007 | Replica |
| 1008 | - | - | 6008 | Replica |

FIG. 17

Replication information — 1700

| Replication source server ID | Replication destination server ID |
|---|---|
| 1001 | 1005, 1006 |
| 1002 | 1006, 1007 |
| 1003 | 1007, 1008 |
| 1004 | 1005, 1008 |

File information 1800

| File name | File size | Master server ID | Replication destination server ID list |
|---|---|---|---|
| a.bin | 100 MB | 1001 | 1005, 1006 |
| b.png | 50 KB | 1001 | 1005 |
| c.obj | 200 KB | 1001 | 1006 |
| d.tar | 20 MB | 1002 | 1005, 1006 |
| e.zip | 500 MB | 1002 | 1006, 1007 |
| ... | ... | ... | ... |

1810 / 1820 / 1830 / 1840

METHOD AND SYSTEM FOR RECOVERING DATA IN DISTRIBUTED COMPUTING SYSTEM

CROSS-REFERENCE TO PRIOR APPLICATION

This application relates to and claims the benefit of priority from Japanese Patent Application No. 2017-136209 filed on Jun. 12, 2017, the entire disclosure of which is incorporated herein by reference.

BACKGROUND

The present invention generally relates to recovery of data in a distributed computing system.

Regarding recovery of data in a distributed computing system, a technique disclosed in National Publication of International Patent Application No. 2015-529861, for example, is known. According to National Publication of International Patent Application No. 2015-529861, in a distributed backup system including a storage device and a plurality of backup apparatuses, the storage device selects a backup apparatus by taking into consideration a requested data transfer size relating to a restore.

SUMMARY

In the following description, a computer as a element of a distributed computing system will be sometimes referred to as a "node". Any computer that has computing resources such as a processor, a memory and a communication interface device may be a node. A node may be a physical computer or a virtual computer that is operated based on at least some of the computing resources of a physical computer.

In the following description, a "dataset" is a collection of logical electronic data viewed from a program such as an application program and may be any of a record, a file, a key-value pair and a tuple, for example.

A distributed computing system in general is made up of a plurality of nodes located in a plurality of sites (for example datacenters or network segments) that are geographically distant from one another and datasets are distributed as replicas among two or more nodes at two or more sites. When a failure occurs in any of the nodes, a recovery process is required. A recovery process includes the process of recovering restoring a dataset held by the node in which the failure has occurred (hereinafter referred to as the failed node) to another node. Specifically, in a recovery process, a restore destination site is determined, and a node (for example an added new node or an existing backup node) at the restore destination site is determined as a restore destination node. Then, a dataset to be restored (a dataset identical to a dataset held by the failed node) is restored from one or more restore source nodes at one or more restore source sites to the restore destination node.

Computing resources of a restore source node is consumed during restore of a dataset (for example during transfer). Accordingly, if the restore of a dataset requires a long time, the period during which the processing performance of the distributed computing system decreases can be prolonged.

At least one node (for example a server, which will be described later) or a different computer (for example a management server, which will be described later) in a distributed computing system including a plurality of nodes that exist at a plurality of sites (A) identifies one or more sites at which one or more nodes that hold one or more datasets that are identical to one or more data sets held by a node to be recovered among the plurality of nodes exist, and (B) determines a restore destination site which is a site of a node to which the one or more identical datasets are to be restored, from the plurality of sites.

According to the present embodiment, the time required for recovery in a distributed computing system can be reduced.

BRIEF DESCRIPTION OF THE DRAWINGS

FIG. 4 is a diagram illustrating a configuration example of server information according to the first embodiment;

FIG. 5 is a diagram illustrating a configuration example of total sum data amount information according to the first embodiment;

FIG. 6 is a diagram illustrating a configuration example of inter-site communication speed information according to the first embodiment;

FIG. 16 is a diagram illustrating a configuration example of server information according to the second embodiment;

FIG. 17 is a diagram illustrating a configuration example of replication information according to the second embodiment;

FIG. 18 is a diagram illustrating a configuration example of file information according to the second embodiment;

DETAILED DESCRIPTION OF THE EMBODIMENTS

Some embodiments of the present invention will be described below.

Note that an "interface unit" in the following description may include one or more interface devices, specifically, at least one of a user interface unit and a communication interface unit. The user interface unit may include at least one of one or more I/O devices (for example input devices (for example a keyboard and a pointing device), output devices (for example a display device)) and a display computer. The communication interface unit may include one or more communication interface devices. One or more communication interface devices may be one or more communication interface devices of the same type (for example one or more network interface cards (NICs)) or may be two or more communication interface devices of different types (for example an NIC and a host bus adapter (HBA)).

In the following description, a "storage unit" includes one or more memories. At least one memory of the storage unit may be a volatile memory. The storage unit is mainly used in process by a processor unit.

In the following description, a "processor unit" includes one or more processors. At least one processor is typically a microprocessor such as a central processing unit (CPU). Each of the one or more processors may be a single-core processor or a multi-core processor. A processor may include a hardware circuit that performs part or all of processes. The processor unit may include a hardware circuit that performs part or all of processes (for example a field-programmable gate array (FPGA) or an application specific integrated circuit (ASIC)).

In the following description, "PDEV" means a physical storage device and typically may be a nonvolatile storage device (for example an auxiliary storage device). A PDEV may be a hard disk drive (HDD) or a solid state drive (SSD). PDEVs of different types may be included in a storage system.

While a process will be sometimes described using a "program" as the subject in the following description, the subject of a process may be a processor unit (or a computer or computer system that includes a processor unit) because a predetermined process is performed by the processor unit by using at least one of a storage unit and an interface unit as appropriate. A program may be installed from a program source to a computer. A program source may be a program distribution server or a computer-readable recording medium (for example a non-transitory recording medium). Further, in the following description, two or more programs may be implemented as one program or one program may be implemented as two or more programs. At least part of a process implemented by a program being executed may be implemented by hardware circuitry.

Figure 21:
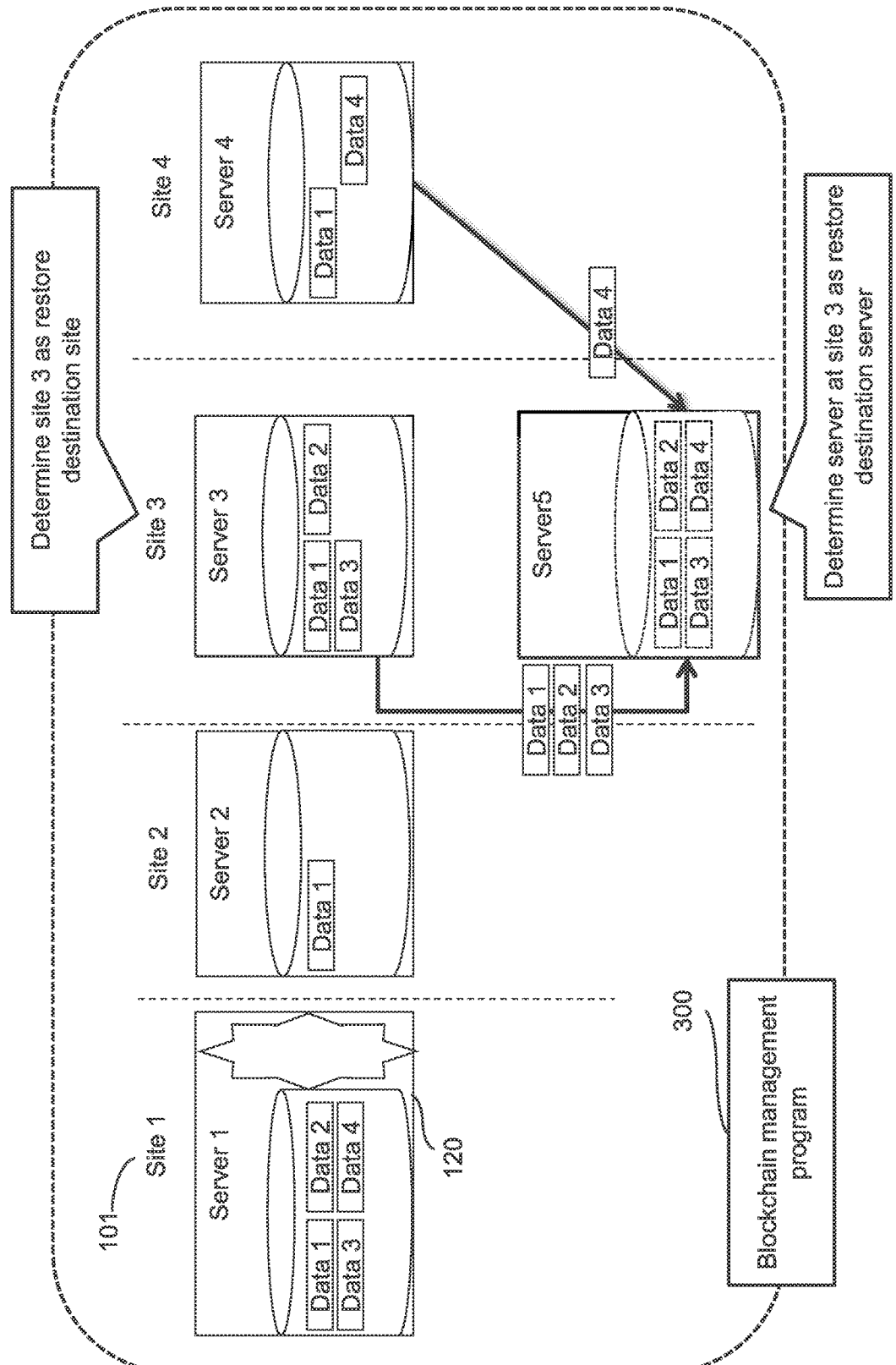
FIG. 21 is a schematic diagram illustrating an overview of the first embodiment.

FIG. 21 is a schematic diagram illustrating an overview of a first embodiment of the present invention.

Assume that a blockchain system (an example of a distributed computing system) according to the first embodiment is made up of one or more servers 120 (for example servers 1 to 4), which are an example of one or more nodes. There are one or more sites 101 (for example sites 1 to 4) at which one or more servers 120 exist.

Further, assume that server 1 holds data 1 to 4, server 2 holds data 1, server 3 holds data 1 to 3 and server 4 holds data 1 and data 4. Each of data 1 to 4 is one example of a dataset and is blockchain data, which will be described later.

Assume that a failure has occurred on server 1. In the description of FIG. 21, server 1 on which a failure has occurred will be referred to as "failed server 1".

As illustrated in FIG. 21, servers 2 to 4 which hold data 1 to 4 identical to data 1 to 4 held by the failed server 1 (an example of a node to be recovered), are not necessarily exist at the same site. Accordingly, if restore of certain data requires only a short time but restore of other data takes a long time, recovery of failed server 1 takes a long time.

In a comparative example, predetermined site 2 may be used as a restore destination site and the server at site 2 may be chosen as a restore destination server when a failure has occurred on any server. However, in the comparative example, data 1 to 4 identical to data 1 to 4 held by failed server 1 need to be transferred from server 3 at site 3 and server 4 at site 4 to the server at site 2 and accordingly the recovery takes a long time.

In the first embodiment, therefore, a blockchain management program 300 identifies sites 2 to 4 at which servers 2 to 4 that hold data 1 to 4 identical to data 1 to 4 held by failed node 1 exist. The blockchain management program 300 then determines a restore destination site that is a site of a server to which data 1 to 4 are to be restored from among a plurality of sites 1 to 4 on the basis of identified sites 2 to 4. In the example in FIG. 21, site 3 is determines as a restore destination site. Then server 5 at restore destination site 3 is selected as a restore destination server. Data 1 to 4 are transferred (restored) from servers 2 to 4 to server 5.

The first embodiment of the present invention will be described below in detail with reference to drawings.

Figure 1:
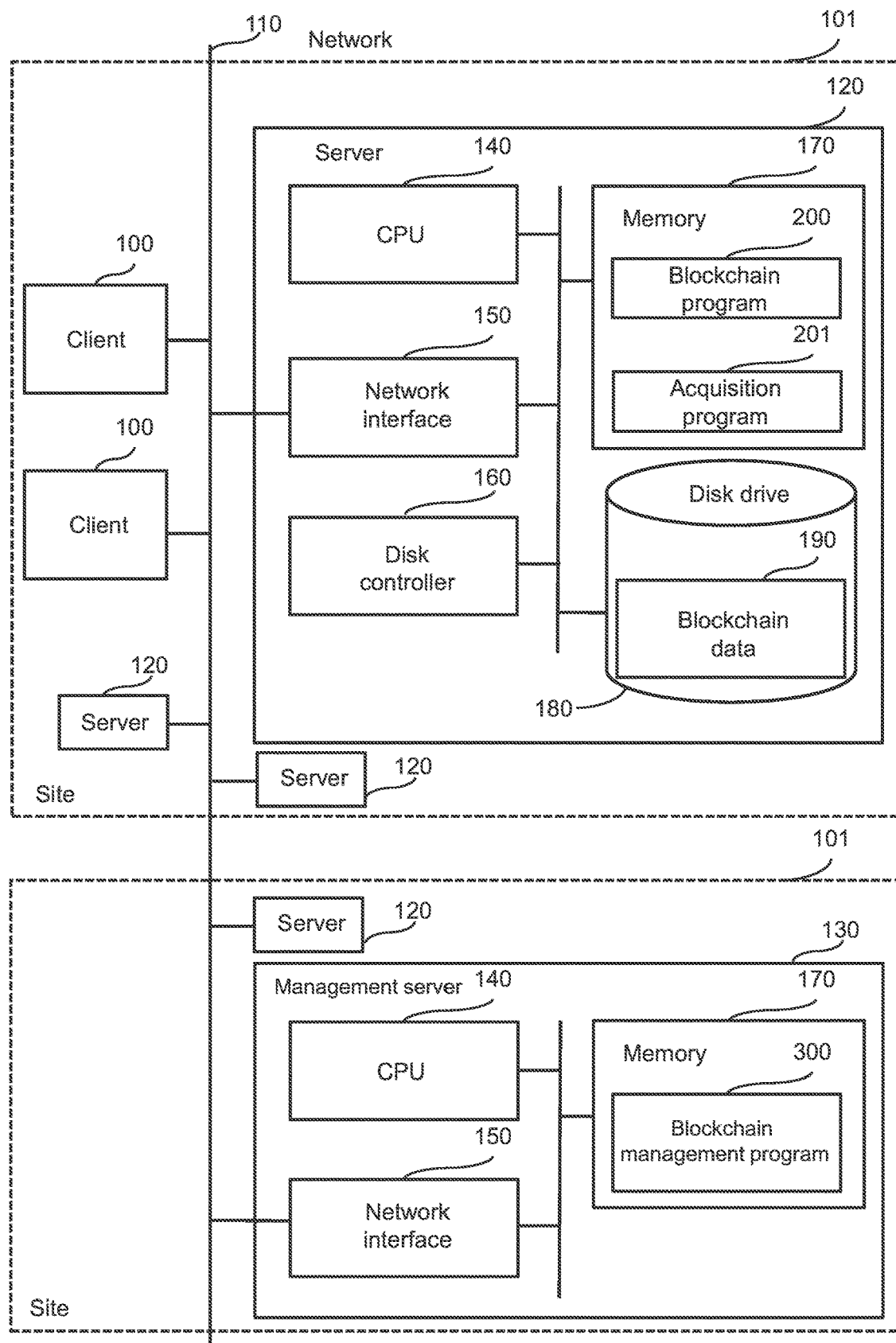
FIG. 1 is a diagram illustrating a configuration example of a blockchain system according to a first embodiment.

FIG. 1 is a block diagram illustrating a general configuration of a blockchain system according to the first embodiment of the present invention.

The blockchain system is an example of a distributed computing system and includes one or more (typically a plurality of) servers 120 which are coupled to one or more clients 100 through a network 110 and one or more management servers 130.

The client 100 is computer to be used for using a blockchain service (an example of a distributed computing service) provided by the one or more servers 120. A client program for using a blockchain service is running on the client 100. A server 120 may also act as the client 100 by running a client program on the server 120.

The network 110 is a network that couples the clients 100, the servers 120 and the management servers 130 to one another. The network 110 is a local area network (LAN) or a wide area network (WAN), for example.

The server 120 is computer that provides a blockchain service to the client 100. The server 120 includes a network interface 150, a disk drive 180, a disk controller 160, a memory 170 and a CPU 140 coupled to these components. The network interface 150 is an example of an interface unit. The disk drive 180 and the memory 170 are an example of a storage unit. The disk controller 160 and the CPU 140 are an example of a processor unit. The CPU 140 executes programs stored in the memory 170. The network interface 150 is used for communication with the client 100. The disk drive 180 is an example of a PDEV and stores a dataset such as a blockchain data 190, for example, which will be described later. The disk controller 160 controls inputs and outputs to and from the disk drive 180. The memory 170 stores programs and data. The network interface 150, the disk drive 180, the disk controller 160, the memory 170 and the CPU 140 may be coupled together through an internal communication path (for example a bus). Note that the server 120 may be virtual machine.

Programs and data are stored in the memory 170 of each server 120. Programs executed by the CPU 140 are a blockchain program 200 and an acquisition program 201, for example. The embodiment will be described on the assumption that the entity that provides a blockchain service is primarily the blockchain program 200.

The blockchain program 200 cooperates with the blockchain programs 200 on other servers 120 to service a smart contract for the client 100 and executes the smart contract on the basis of a transaction request received from the client 100.

The disk controller 160 inputs and outputs data to and from the disk drive 180 on a block basis, for example, on the basis of an input/output requests from various programs stored in the memory 170.

The disk drive 180 is a storage device for storing data that is read and written by various programs stored in the memory 170. In the embodiment, blockchain data 190 is stored in the disk drive 180.

The management server 130 is a computer that manages the blockchain system and an example of a management system. A "management system" may be made up of one or more computers. Specifically, if a management computer includes a display device and the management computer displays information on its display device, for example, the management computer may be the management system. Alternatively, if a management computer sends display information to a remote display computer and the display computer displays the information (if the management computer displays information on the display computer), for example, the management system may be a system that includes at least the management computer out of the management computer and the display computer. "Displaying display information" by a computer in the management system may be displaying display information on a display device of the computer or may be transferring display information by the computer to a display computer (in the latter case, the display information is displayed by the display computer).

The management server 130 checks at predetermined intervals if the servers 120 are alive or not (down or not), performs a recovery process on the basis of the result of the check, and accepts registration of information concerning the blockchain system from a blockchain system administrator (hereinafter referred to as the administrator). The management server 130 includes a network interface 50 (an example of an interface unit), a memory 70 (an example of a storage unit) and a CPU 40 (an example of a processor unit) coupled to these components. The memory 70 stores a blockchain management program 300. The blockchain management program 300 is executed by the CPU 40 to check if the servers 120 are alive or not at regular intervals and, if a server 120 is down, performs a recovery process. Note that the blockchain management program 300 may run on any of the client 100 and the server 120 and if this is the case, the client 100 may also act as a management server 130 or the server 120 may also act as a management server 130.

One or more (typically a plurality of) servers 120 that make up the blockchain system exist at one or more (typically a plurality of) sites 101. Each site 101 is a datacenter or the same network segment. A management server 130 may be installed at least one site 101. In a cloud environment, for example, many datacenters exist, a virtual machine is created in each datacenter, and the virtual machines are coupled through a network 110 between the sites 101.

Figure 2:
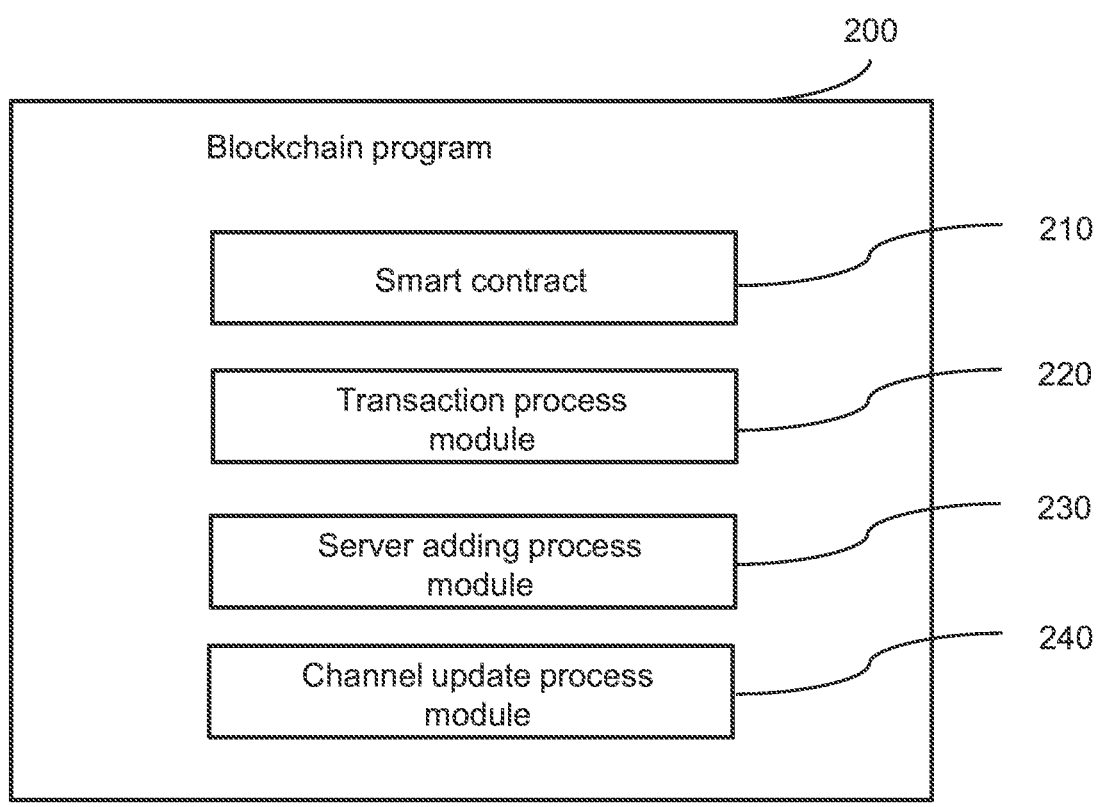
FIG. 2 is a diagram illustrating a configuration example of a blockchain program according to the first embodiment.

FIG. 2 is a block diagram illustrating a functional configuration of a blockchain program 200. Note that the server 120 that executes the blockchain program 200 illustrated in FIG. 2 will be referred to as the "own server 120" and at least one of the servers 120 other than the own server 120 will be referred to as an "other server 120" in the description of FIG. 2. A site 101 at which the server 120 that executes the blockchain program 200 illustrated in FIG. 2 exists will be referred to as the "own site 101" and at least one of the sites 101 other than the own site 101 will be referred to as an "other site 101".

The blockchain program 200 includes a smart contract 210, a transaction process module 220, a server adding process module 230 and a channel update process module 240.

The smart contract 210 is executed by the CPU 140 of the own server 120. The smart contract 210 is a program that processes trades of financial assets such as a virtual currency or stocks, for example. Note that there may be a plurality of types of smart contracts 210. Transactions and smart contracts 210 may be in 1:1, 1:N (N is an integer equal to or larger than 2), M:1 (M is an integer equal to or larger than 2), or M:N correspondence.

The transaction process module 220 is executed by the CPU 140 of the own server 120 in response to a transaction request from a client 100. The transaction process module 220 receives a transaction request and executes a corresponding smart contract 210 on the basis of the transaction request. Further, the transaction process module 220 distributes the result of the execution to one or more other servers 120 that belong to one or more channels to which the server 120 that executes the module 220 belongs, confirms the result and then returns a transaction process result to the client 100. A "channel" herein means a data sharing range in the blockchain system and, specifically, a group of one or more servers 120. Data can be shared only among the servers 120 that belong to the same channel.

The server adding process module 230 is executed by the CPU 140 of the own server 120 on the basis of an instruction from the administrator when the administrator has added a new server 120. The server adding process module 230 measures the speed of communication with a server 120 at an other site 101 and updates inter-site communication speed information 600. If a plurality of servers 120 exist in the own site 101 or an other site 101, the server adding process module 230 obtains communication speed (for example, any of average speed, highest speed and lowest rate) based on the speeds of communication between the own server 120 and two or more other servers 120 at the own site 101 or other sites 101, for example, (or obtains the communication speed with a representative other server at the own site 101 or other sites 101), and updates inter-site communication speed information 600 with the communication speed as the communication speed within the own site 101 or the communication speed with the other sites 101. If the own server 120 is the only server 120 at the own site 101, the communication speed within the own site 101 may be the upper limit speed of the network interface 150 (for example a network interface card (NIC)) of the own server 120.

The channel update process module 240 is used when the administrator creates a channel or adds a server 120 to a channel. Specifically, for example, the administrator provides a channel creation instruction in which a server ID and a channel ID are specified to the blockchain program 200 on a server 120. In response to the channel creation instruction, the channel update process module 240 adds the channel ID specified in the channel creation instruction to a participating channel ID list 420 (see FIG. 4) of an entry that has the server ID specified in the instruction. Note that if there is not such an entry, the channel update process module 240 creates a new entry. When the blockchain program 200 receives a transaction request in which a channel ID is specified from a client 100, the blockchain program 200 executes a transaction according to the request and distributes the result of the execution of the transaction to blockchain programs 200 on the other servers 120 that belong to the specified channel ID.

Figure 3:
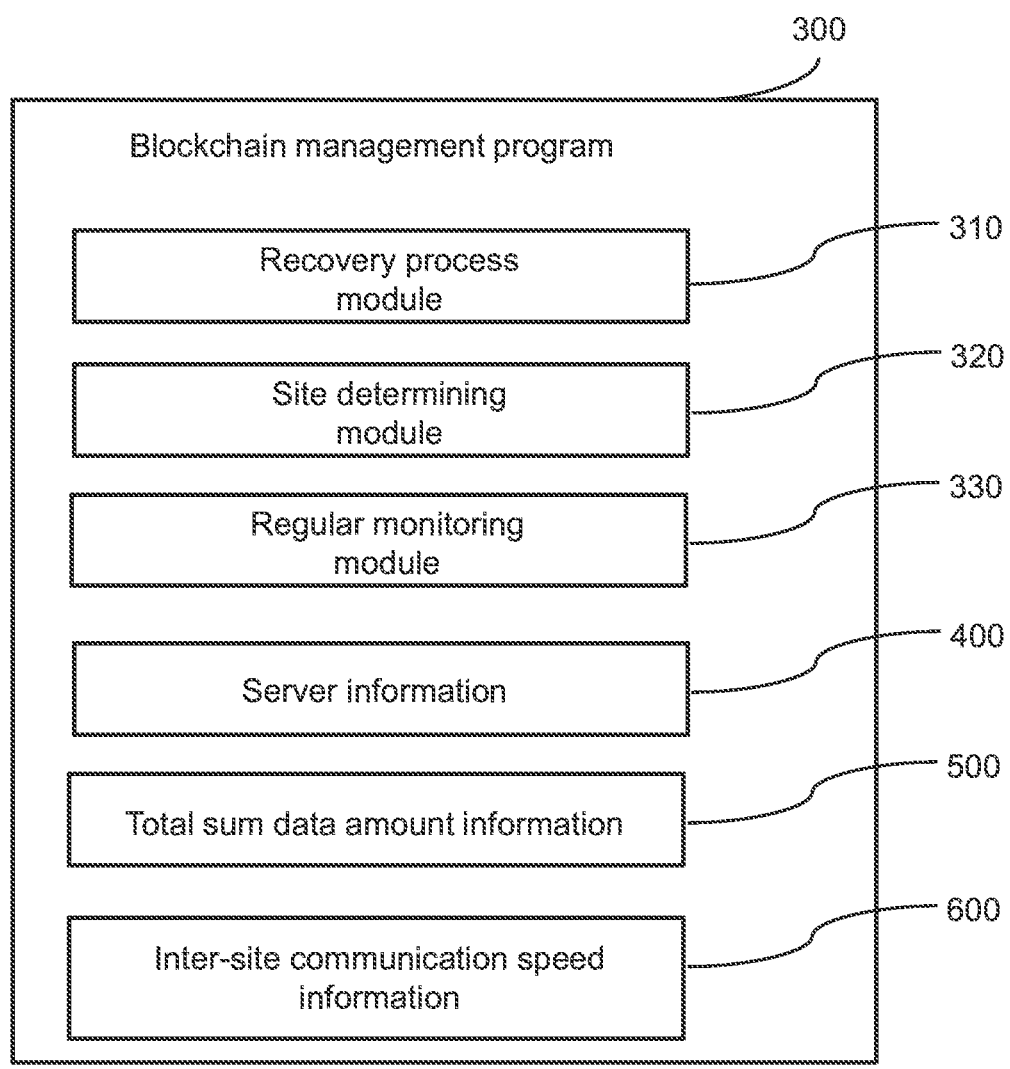
FIG. 3 is a diagram illustrating a configuration example of a blockchain management program according to the first embodiment.

FIG. 3 is a diagram illustrating a configuration example of the blockchain management program 300.

The blockchain management program 300 includes a recovery process module 310, a site determining module 320, and a regular monitoring module 330 and manages server information 400, total sum data amount information 500 and inter-site communication speed information 600.

The recovery process module 310 detects a down of a server 120 through a loss of a heartbeat signal or the like, determines a location in which a new server is to be created by using the site determining module 320 (hereinafter referred to as a restore destination site), and creates a new server 120 at the restore destination site. Note that the server created may be a virtual machine. The recovery process module 310 then restores data held by the server 120 that has gone down to a restore destination server at the restore destination site from the server that has a higher communication speed in precedence to other servers on the basis of at least part of information used when the restore destination site has been determined.

The site determining module 320 determines a restore destination site to which whole data held by a server that has gone down can be restored in the shortest time, on the basis of server information 400, total sum data amount information 500 and inter-site communication speed information 600.

The regular monitoring module 330 is executed by the CPU 40 of the management server 130 at regular intervals on the basis of a predetermined schedule, calculates the total amount of blockchain data 190 of each channel, and updates total sum data amount information 500.

The server information 400 is information indicating the relationship among a server, a channel and a site. The total sum data amount information 500 is information indicating the total amount of blockchain data 190 of each channel. The inter-site communication speed information 600 is information indicating the communication speed between sites and is updated by the blockchain program 200 when a server 120 is added or at predetermined intervals.

FIG. 4 is a diagram illustrating a configuration example of server information 400.

The server information 400 is a table, for example, and includes an entry for each server. Each entry stores information such as a server ID 410, a participating channel ID list 420 and a site ID 430. One server 120 (a "target server" in the description of FIG. 4) is taken as an example in the following description.

The server ID 410 is an ID for identifying a target server 120. The participating channel ID list 420 is a list of IDs for identifying channels to which the target server 120 belongs. The site ID 430 is an ID for identifying the site to which the target server 120 belongs.

FIG. 5 is a diagram illustrating a configuration example of total sum data amount information 500.

The total sum data amount information 500 is a table, for example, and includes an entry for each channel. Each entry stores information such as a channel ID 510 and a total sum data amount 520. One channel (a "target channel" in the description of FIG. 5) is taken as an example in the following description.

The channel ID 510 is an ID of a target channel. The total sum data amount 520 indicates the total amount (total sum data amount) of data handled in the target channel.

FIG. 6 is a diagram illustrating a configuration example of inter-site communication speed information 600.

The inter-site communication speed information 600 is a matrix of site IDs 610 and site IDs 620, for example. Each cell stores a value indicating communication speed between a site indicated by a site ID 610 corresponding to the cell and a site indicated by a site ID 620 corresponding to the cell.

An example of a process performed in the embodiment will be described below.

Figure 7:
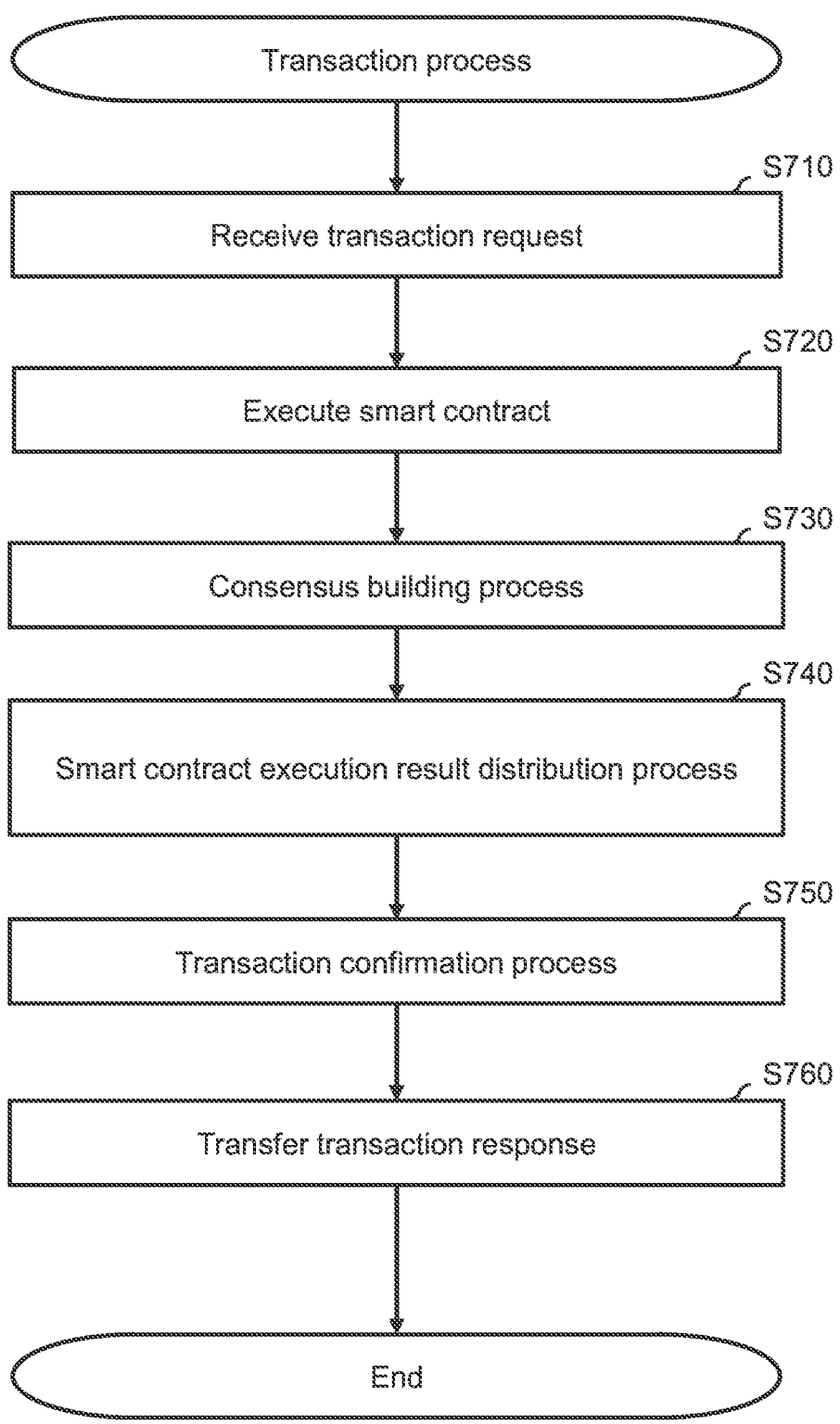
FIG. 7 is a flowchart illustrating an example of a transaction process according to the first embodiment.

FIG. 7 is an example flowchart of a transaction process.

The transaction process module 220 of the blockchain program 200 receives a transaction request from a client 100 (S710). The transaction request includes a channel ID and a parameter (for example a parameter specifying a smart contract).

The transaction process module 220 then executes the smart contract 210 specified in the transaction request (S720). The result of the execution of the smart contract, i.e. a return value and data to be reflected in blockchain data 190 is saved in the memory 170 for use in a consensus building process.

The transaction process module 220 then performs the consensus building process (S730). The consensus building process is performed in order to atomically write the result of the execution of the smart contract in the blockchain data 190 on a plurality of serves 120.

The transaction process module 220 then distributes the result of the execution of the smart contract to the servers 120 that belongs to the channel having the channel ID included in the transaction request (S740).

The transaction process module 220 then writes the result of the execution of the smart contract in the blockchain data 190 (S750).

Lastly, the transaction process module 220 transfers a response to the transaction request to the client 100 (S760).

Figure 8:
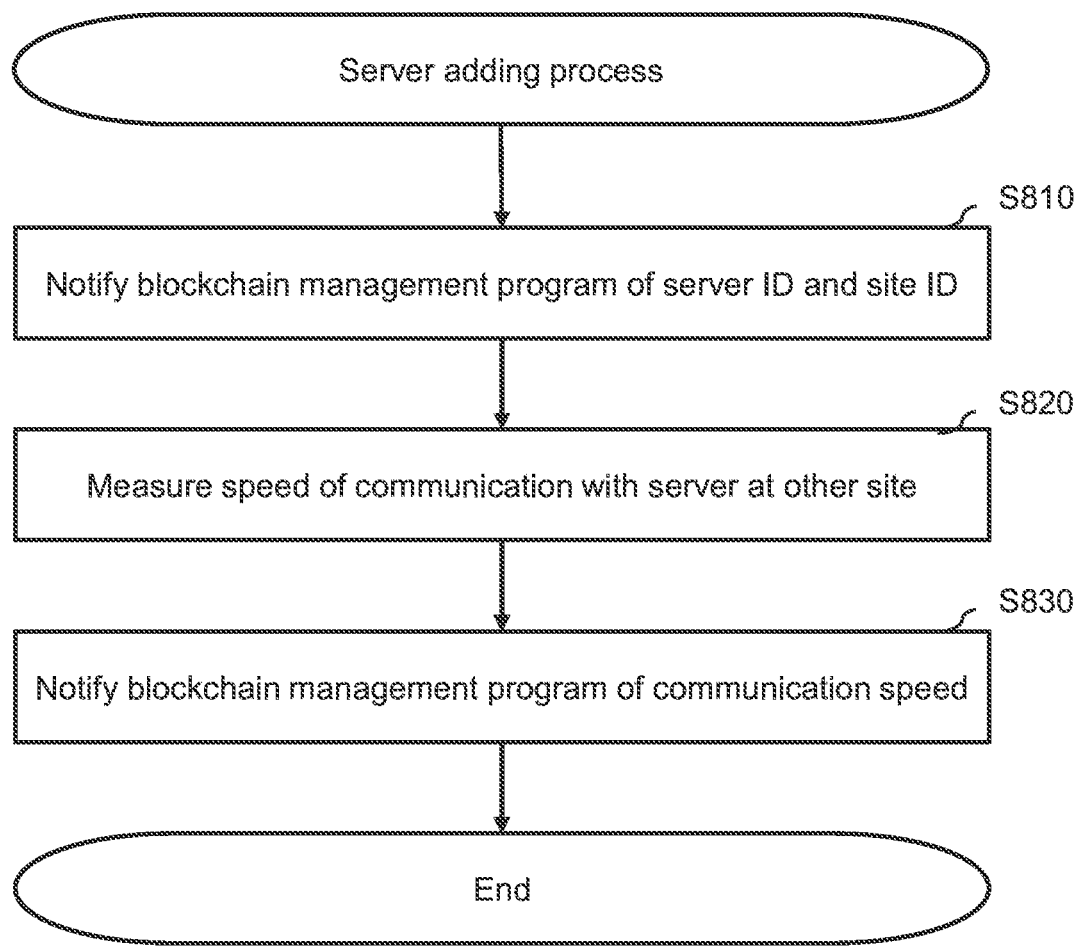
FIG. 8 is a flowchart illustrating an example of a server adding process according to the first embodiment.

FIG. 8 is an example flowchart of a server adding process. The server adding process is performed in response to addition of a new server 120 to a site 101 by the administrator or the like. In the following description of FIG. 8, a server 120 added will be referred to as the "added server 120" and a site 101 to which the server 120 is added will be referred to as the "addition target site 101".

First, the acquisition program 201 in the added server 120 notifies the blockchain management program 300 of a server ID of the added server 120 and a site ID of the add-to site (S810). Based on the notification, the blockchain management program 300 updates server information 400 (for example, the blockchain management program 300 adds an entry associated with the added server 120 and stores the server ID and the site ID into the entry).

Then, the acquisition program 201 in the added server 120 measures the communication speed between the added server 120 and a server 120 in an other site (S820).

The acquisition program 201 in the added server 120 then notifies the blockchain management program 300 of the measured communication speed (S830). The blockchain management program 300 updates inter-site communication speed information 600 on the basis of the notified communication speed. A new value to be used after the update may be any of the average value, largest value and smallest value between an old value (a value already registered) and the value indicated in S830, for example.

Figure 9:
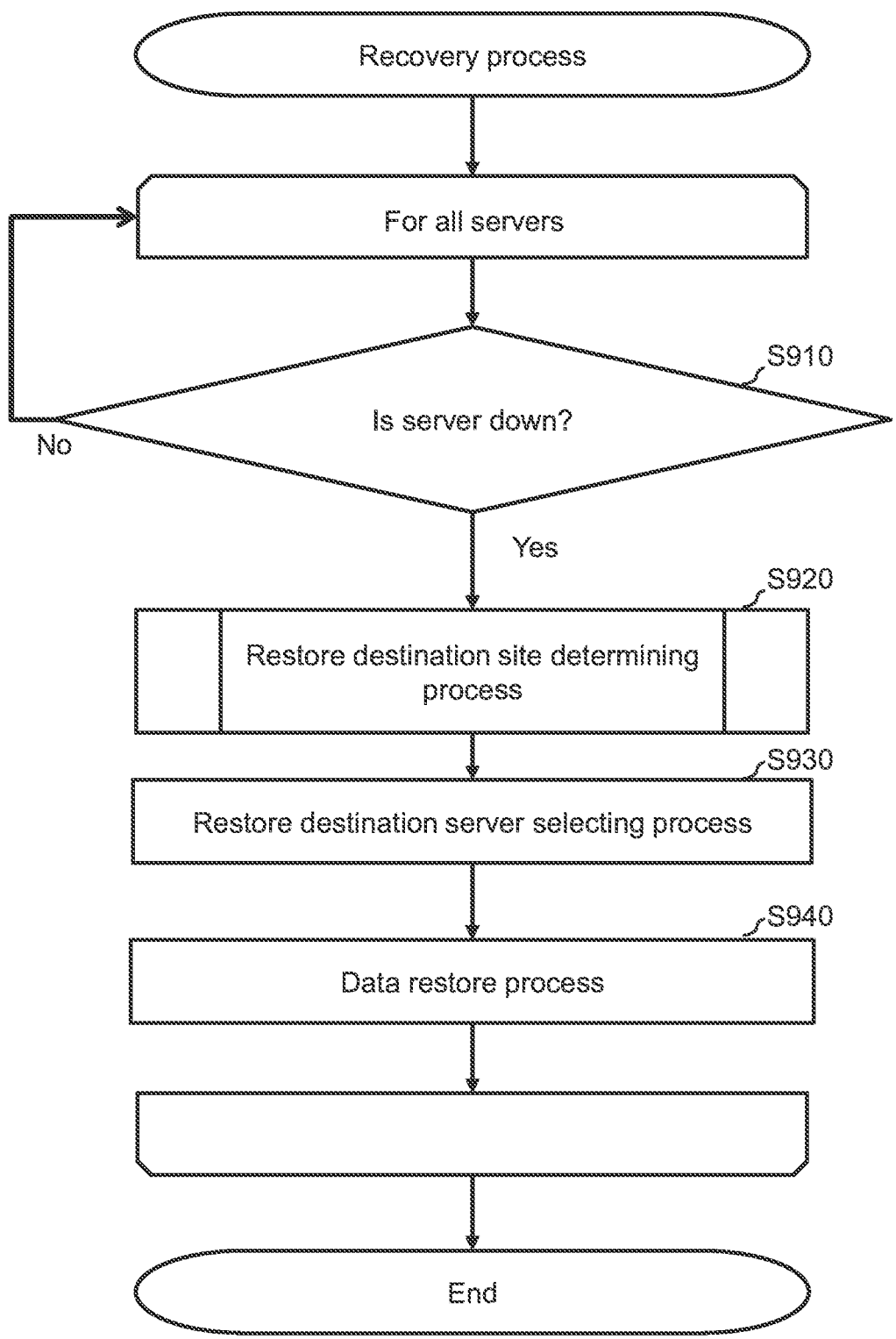
FIG. 9 is a flowchart illustrating an example of a recovery process according to the first embodiment.

FIG. 9 illustrates an example flowchart of a recovery process. The recovery process is executed on the basis of a predetermined schedule, for example.

Based on a heartbeat signal or the like, the recovery process module 310 determines, for each server 120, whether or not the server 120 is down (S910). If it is determined that any of the servers 120 is down (S910: Yes), S920 is performed. A server 120 that is down will be hereinafter referred to as a "failed server 120".

Then the recovery process module 310 identifies a restore destination site by causing the site determining module 320 to execute a restore destination site determining process (S920).

The recovery process module 310 then executes a restore destination server selecting process of selecting a server at the restore destination site identified in S920 as a restore destination server (S930). The restore destination server selecting process is performed on the basis of server information 400, for example. Note that the restore destination server may be a new server created or an existing backup server. A created new server may be a server automatically created using an application programming interface (API) provided by a cloud computing system or may be a server manually created by the administrator.

Lastly, the recovery process module 310 executes a data restore process of restoring data identical to blockchain data 190 held by the failed server 120 (hereinafter referred to as restore target data) to the restore destination server (S940). The data restore process may be any of the following processes for each piece of restore target data. Note that if there are two or more other servers that store the same restore target data, another server 120 at a site 101 that has the fastest speed of communication with the restore destination site may be selected as a restore source server.

The recovery process module 310 reads restore target data from another server 120 and writes the restore target data to the restore destination server 120.

The recovery process module 310 transfers a restore instruction to a restore source server 120. An ID of the restore target data and an ID of the restore destination server, for example, are specified in the restore instruction. The restore source server 120 that has received the restore instruction (for example the blockchain program 200) writes the restore target data specified in the restore instruction to the restore destination server specified in the restore instruction.

The recovery process module 310 transfers a restore instruction to the restore destination server 120. An ID of the restore target data and an ID of the restore source server, for example, are specified in the restore instruction. The restore destination server 120 that has received the restore instruction (for example the blockchain program 200) reads the restore target data specified in the restore instruction from the restore source server specified in the restore instruction.

Figure 10:
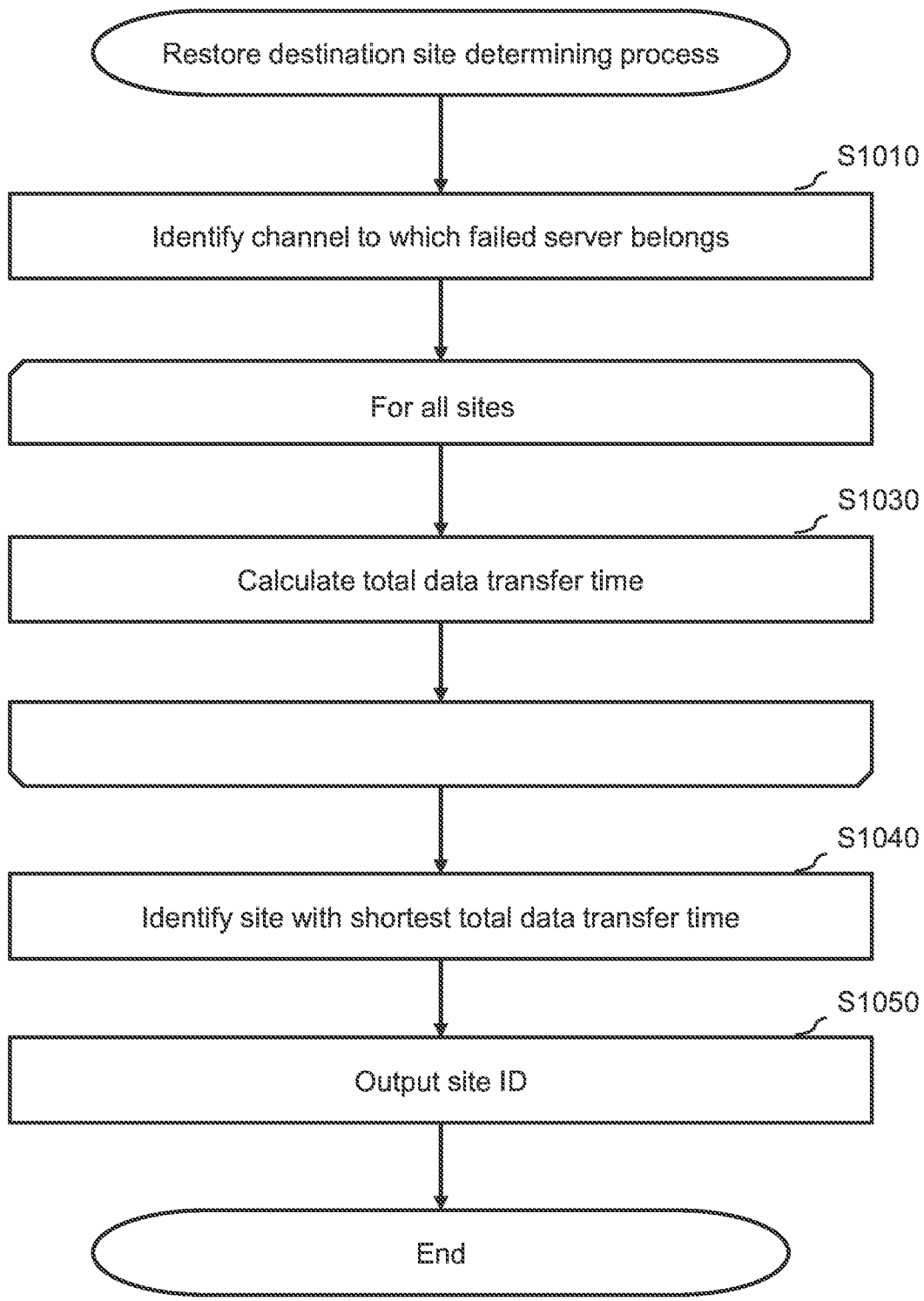
FIG. 10 is a flowchart illustrating an example of a restore destination site determining process according to the first embodiment.

FIG. 10 is an example flowchart of a restore destination site determining process. The restore destination site determining process may be executed in response to a request from the recovery process module 310 or an instruction from the administrator. An ID of a failed server ID is specified in the request or the instruction.

First, the site determining module 320 refers to a participating channel ID list 420 associated with the specified server ID (the server ID of the failed server) to identify a channel to which the failed server belongs (S1010). Data (restore target data) that is identical to whole blockchain data 190 that belongs to the channel identified here needs to be acquired from another server 120 in a recovery process.

Then, the site determining module 320 performs S1030 for each site. One site (a "target site" in the description of FIG. 10) will be used as an example in the following description.

Based on total sum data amount information 500 and inter-site communication speed information 600, the site choosing module 320 calculates total data transfer time which is the transfer time required for transferring whole data to be restored (blockchain data to be handled in the all channels identified in 1010) to the target site (S1030). The total transfer time is the sum of X transfer times associated with X channels identified in S1010 (X is a natural number). The transfer time of each channel is calculated on the basis of the data amount of restore target data (total sum data amount) and the communication speed between the site that holds the restore target data and the target site (for example, transfer time=total sum data amount/communication speed). If two or more sites hold restore target data for a certain channel, there are two or more transfer times and the shortest one of the two or more transfer times is chosen as the transfer time for the channel, by way of example of any of the two or more transfer times. In other words, the site that has the fastest speed of communication with the target site among the two or more sites is adopted as the restore source site.

In this way, the total transfer time is calculated for each site. The site determining module 320 determines the site that corresponds to the shortest total data transfer time, which is one example of any total data transfer time among all data transfer times, as the restore destination site (S1040). The site determining module 320 outputs the site ID of the determined restore destination site (S1050). Specifically, the site ID may be output to the recovery process module 310 or may be displayed to the administrator, for example.

Note that while S1030 is performed for all sites 101 in the example described above for simplicity of explanation, S1030 may be performed, for example, only for the site 101 at which a server 120 that belongs to the same channel to which a failed server has belonged exits. For example, taking FIG. 4 as an example, if a server 1001 (the server with a server ID of "1001") is a failed server, the sites at which other servers that belong to channel A to which the server 1001 belongs exist are a site 6002 (the site with a site ID of "6002") and a site 6003 alone and only the two sites may be chosen as the sites for which S1030 is performed (i.e. sites set as the "target site" in the description of S1030).

Further, steps S1030 and S1040 may be omitted. For example, taking FIG. 4 as an example, if a server 1006 is a failed server, the site at which other servers that belong to channel E to which the server 1006 belongs exit is a site 6005 alone and the site ID of the site 6005 may be output in S1050 as the site ID of the restore destination site.

Figure 11:
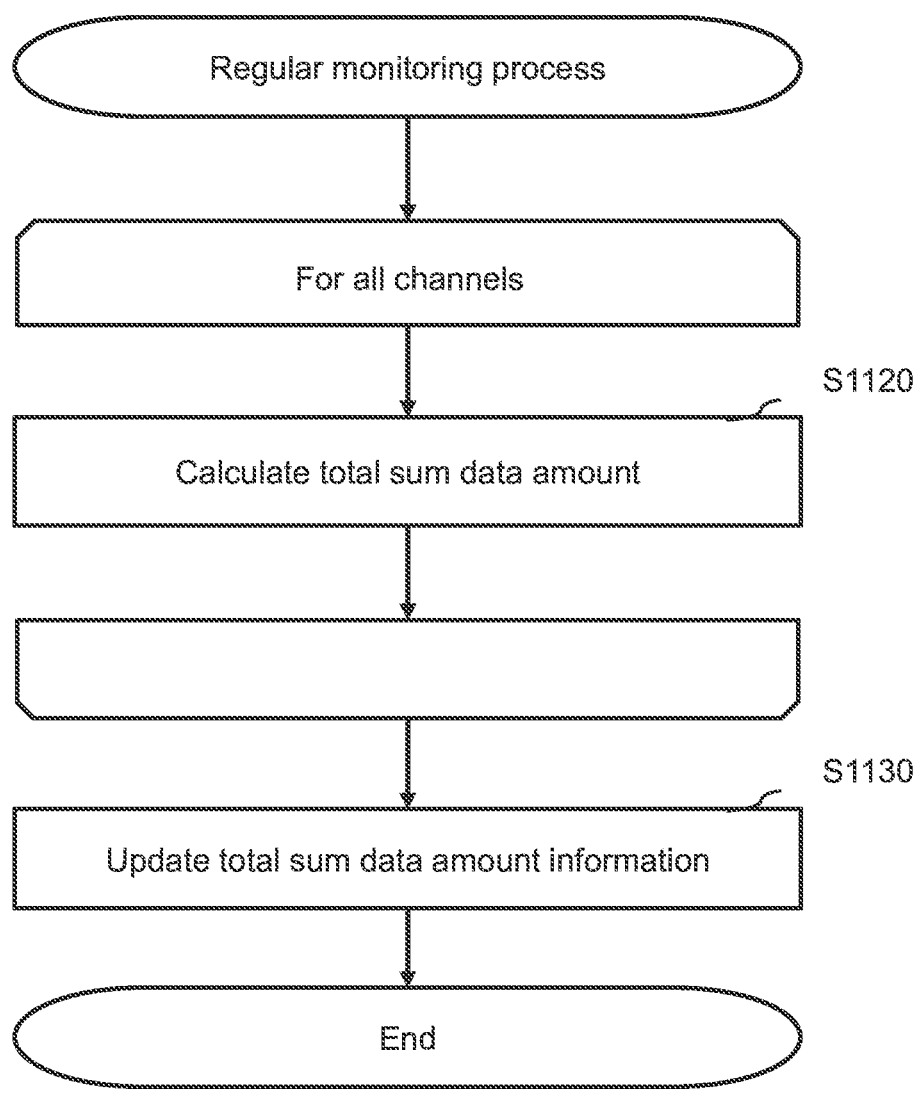
FIG. 11 is a flowchart illustrating an example of a regular monitoring process according to the first embodiment.

FIG. 11 is an example flowchart of a regular monitoring process. The regular monitoring process is executed in response to an instruction from the administrator or on the basis of a predetermined schedule.

The regular monitoring module 330 performs S1120 for all channels. One channel is taken as an example (a "target channel" in the description of FIG. 11) in the following description.

The regular monitoring module 330 calculates the sum of the data amounts handled by a target channel, i.e. a total sum data amount (S1120). S1120 can be accomplished by the regular monitoring module 330 acquiring the amount of blockchain data 190 on each server 120.

The regular monitoring module 330 updates total sum data amount information 500 by registering the total sum data amount of each channel in the total sum data amount information 500 (S1130).

Further, inter-site communication speed information 600 may be updated in the regular monitoring process. For example, the regular monitoring module 330 may request a server at the target site to measure the communication speed between the target site and each of the other sites and may update inter-site communication speed information 600 on the basis of the communication speeds notified in response to the request.

As has been described above, according to the embodiment, a site that has the shortest total data transfer time is determined as a restore destination site on the basis of server information 400, total sum data amount information 500 and inter-site communication speed information 600. Accordingly, the time required for recovery for ensuring high data availability in a blockchain system in which data is distributed and saved among a plurality of servers can be reduced. Since the time required for recovery is reduced, the period of time during which the transaction processing performance of the blockchain system decreases can be reduced.

A second embodiment of the present invention will be described below in detail with reference to drawings. The description will focus on differences from the first embodiment and description of what the second embodiment has in common with the first embodiment will be omitted or provided briefly. In the second embodiment, a file is an example of a dataset.

Figure 12:
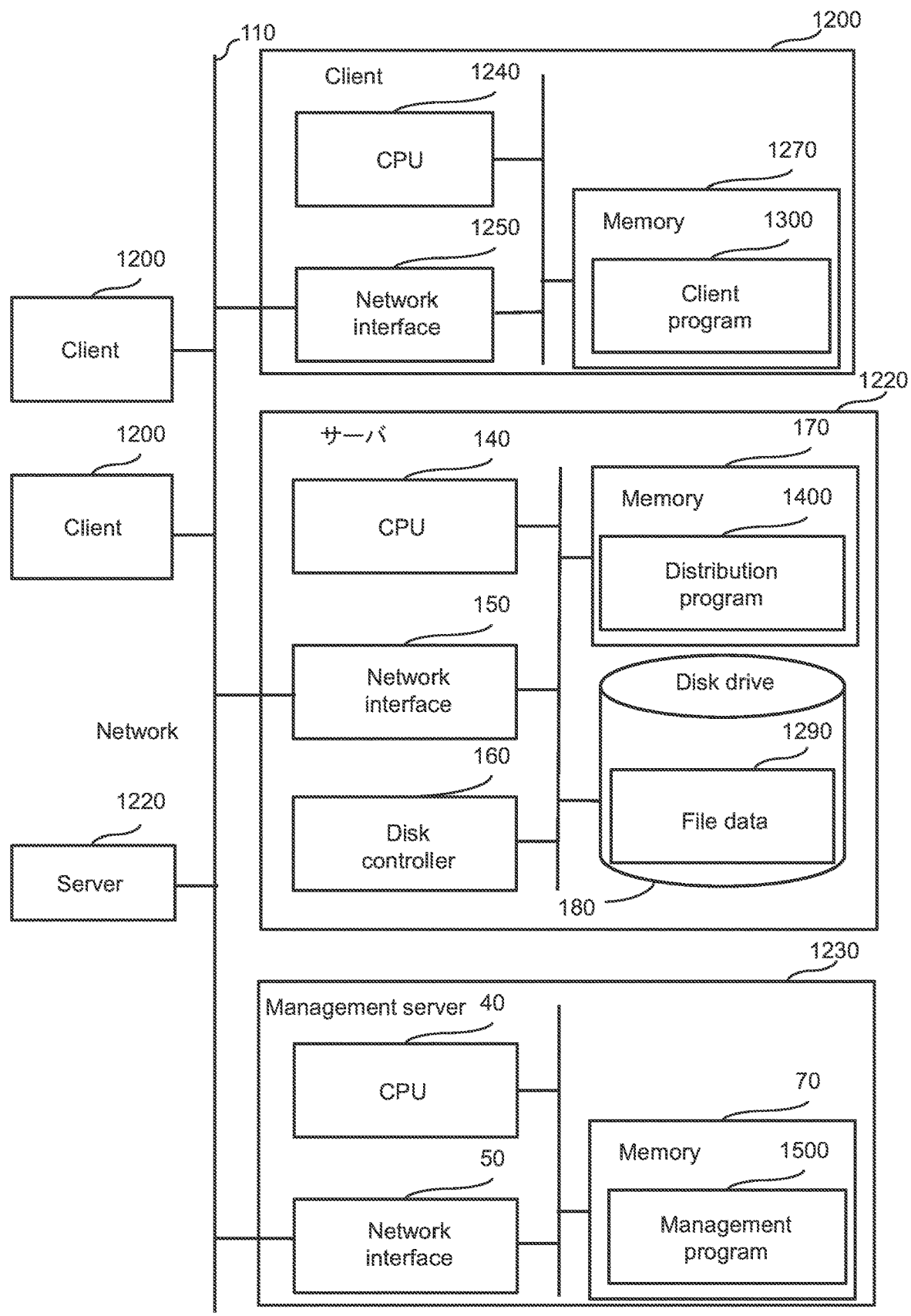
FIG. 12 is a diagram illustrating a configuration example of a distributed file system according to a second embodiment.

FIG. 12 is a block diagram illustrating a general configuration of a distributed file system according to the second embodiment of the present invention. The distributed file system is an example of a distributed computing system.

A client 1200 includes a network interface 1250, a memory 1270 and a CPU 1240 coupled to these components. The network interface 1250 is coupled to a network 110. The memory 1270 stores a client program 1300.

A memory 170 in a server 1220 stores a distribution program 1400. A CPU 140 executes the distribution program 1400. A disk drive 180 stores file data 1290.

A memory 70 in a management server 1230 stores a management program 1500. A CPU 40 executes the management program 1500.

Note that the management server 1230 may also act as at least one of a client 1200 and a server 1220 by running at least one of the management program 1500 and the client program 1300 on the management server 1230. At least one of the clients 1200, the servers 1220 and the management server 1230 may be a virtual machine. In the embodiment, the entity that provides a distributed file service is the distribution program 1400 as an example. While sites are omitted from FIG. 12, there are sites 101 in the second embodiment as in the first embodiment.

The distribution program 1400 cooperates with the distribution programs 1400 and the management programs 1500 on other servers 1220 to service a distributed file system and acquires and stores file contents on the basis of file read and file write requests received from a client 1200.

Figure 13:
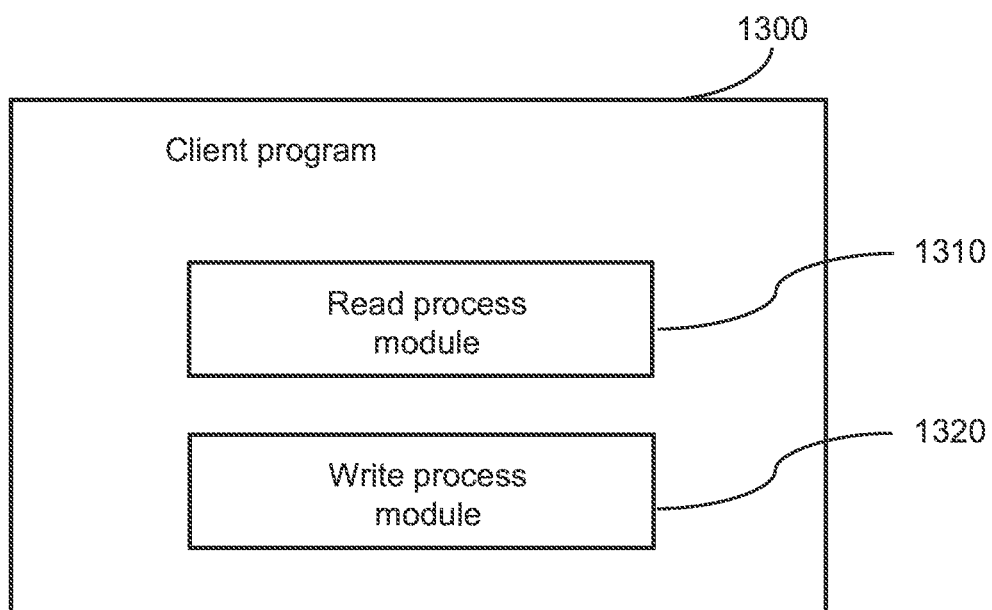
FIG. 13 is a diagram illustrating a configuration example of a client program according to the second embodiment.

FIG. 13 is a block diagram illustrating a functional configuration of the client program 1300.

The client program 1300 includes a read process module 1310 and a write process module 1320.

The read process module 1310 is executed by the CPU 1240 of the client 1200 in response to a file read instruction from a distributed file system user (hereinafter referred to as a user). The read process module 1310 inquires a server 1220 from which a file is to be read of the management program 1500 and transfers a read request to the server 1220 indicated by a response to the inquiry.

The write process module 1320 is executed by the CPU 1240 of the client 1200 in response to a file write instruction from a user. The write process module 1320 inquires a server 1220 to which the file is to be written of the management program 1500 and transfers a write request to the server 1220 indicated by a response to the inquiry.

Figure 14:
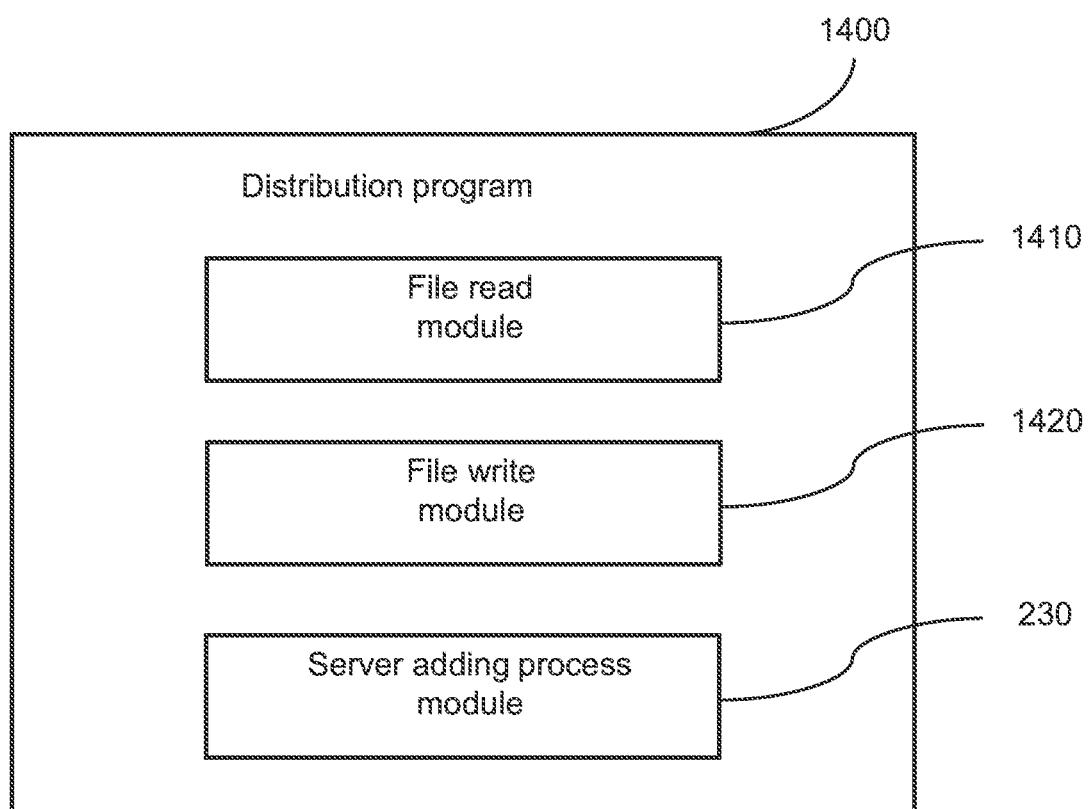
FIG. 14 is a diagram illustrating a configuration example of a distribution program according to the second embodiment.

FIG. 14 is a block diagram illustrating a functional configuration of the distribution program 1400.

The distribution program 1400 includes a file read module 1410, a file write module 1420 and a server adding process module 230.

Based on a read request from the client program 1300, the file read module 1410 reads a file specified in the request and returns the read file to the client program 1300.

Based on a write request from the client program 1300, the file write module 1420 writes a file specified in the request. Further, the file write module 1420 updates a file size 1820 (see FIG. 18) associated with the write target file to the written file size. If the write request is not a write request for replication, the file write module 1420 stores a server ID of the own server (the server that executes the distribution program 1400 in FIG. 14) as a master server ID 1830 associated with the write target file. If the write request is a write request for replication, the file write module 1420 adds the server ID of the own server to a replication destination server ID list 1840 associated with the write target file.

Figure 15:
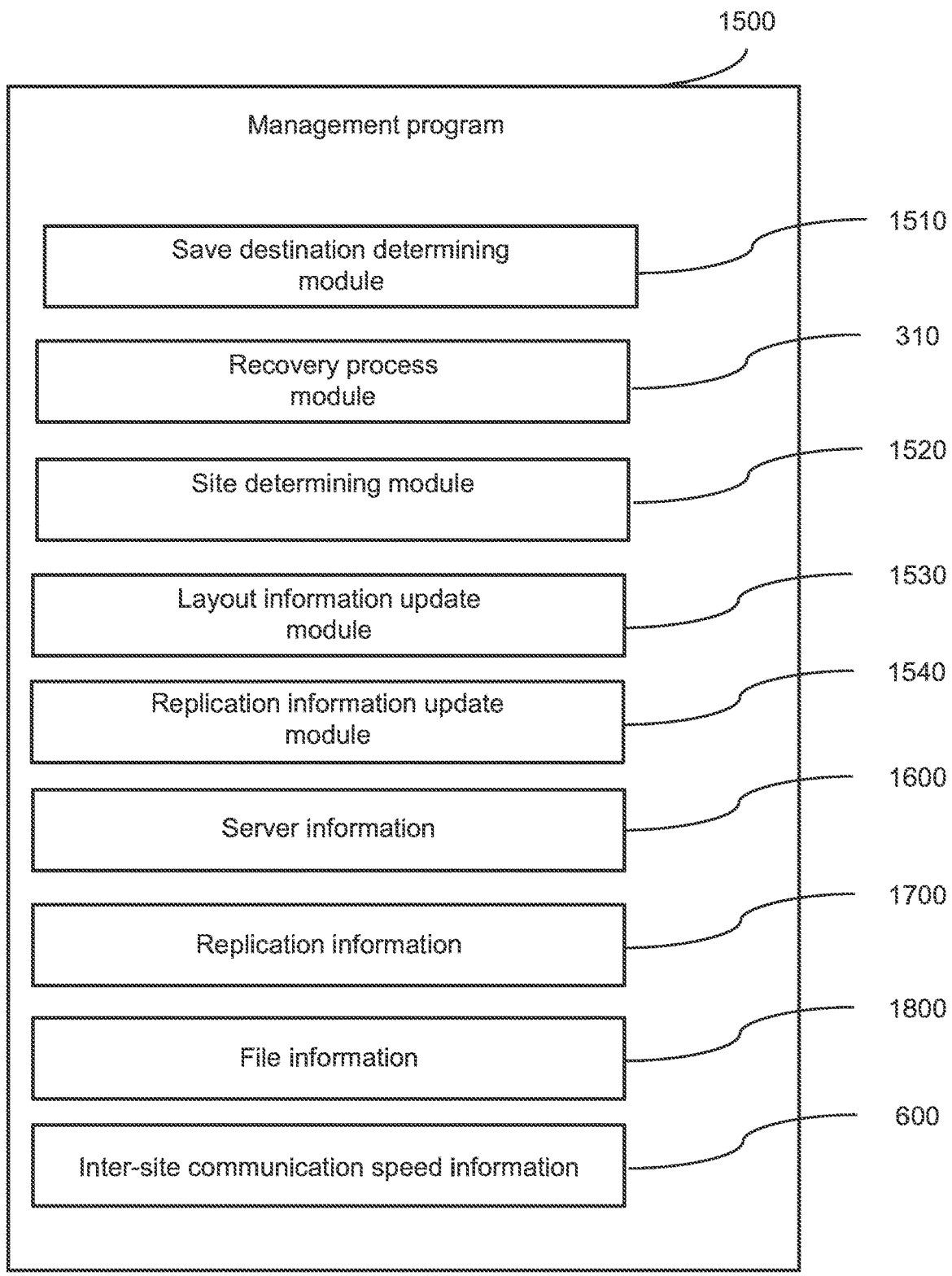
FIG. 15 is a diagram illustrating a configuration example of a management program according to the second embodiment.

FIG. 15 is a diagram illustrating a configuration example of the management program 1500.

The management program 1500 includes a save destination determining module 1510, a recovery process module 310, a site determining module 1520, a layout information update module 1530 and a replication information update module 1540 and manages server information 1600, replication information 1700, file information 1800 and an inter-site communication speed information 600. The management program 1500 behaves like a metadata server of the distributed file system using file information 1800 and the like and the distribution program 1400 cooperates with the management program 1500 to provide a distributed file system service. The management program 1500 also performs operational management such as a recovery process in the distributed file system by using the recovery process module 310 and the like.

The save destination determining module 1510 performs a process of identifying servers on which a file is to be read and written.

For example, when the save destination determining module 1510 receives a read query in which a filename is specified (a query about a server from which a file having a specified filename is to be read) from the read process module 1310 of the client program 1300, the save destination determining module 1510 identifies an entry that has the specified filename as a filename 1810 in the file information 1800 (see FIG. 18). The save destination determining module 1510 then returns a master server ID in the entry to the client program 1300.

Further, for example, when the save destination determining module 1510 receives a write query in which a filename is specified (a query about a server to which a file having a specified filename is to be written) from the write process module 1320 of the client program 1300, the save destination determining module 1510 returns a write destination server ID and a write destination server ID for replication. Specifically, for example, the save destination determining module 1510 checks if the specified filename exists in the file information 1800. If the filename exists, the save destination determining module 1510 chooses a master server ID in the entry in which the filename exists as the write destination server ID. If the filename does not exist, the save destination determining module 1510 calculates a hash value of the specified filename and chooses a server ID in an entry that has a minimum hash value 1620 and a maximum hash value 1630 between which the hash value falls as the write destination server ID. Further, for the write destination server ID for replication, for example, the save destination determining module 1510 identifies an entry that has the write destination ID as a replication source server ID 1710 in replication information 1700 (see FIG. 17). Then, the save destination determining module 1510 determines at least one of one or more server IDs included in the replication destination server IDs 1720 in the entry (for example at least one server ID selected randomly or in a round-robin fashion) as the write destination server ID for replication. Lastly, the save destination determining module 1510 returns the write destination server ID and the write destination server ID for replication to the client program 1300.

The site determining module 1520 determines a restore destination site on the basis of file information 1800, server information 1600 and inter-site communication speed information 600.

The layout information update module 1530 is executed by the CPU 40 of the management server 1230 in response to a layout information update instruction from a user. The layout information update module 1530 obtains a range of hash values of the filename of a file to be held by each server 1220 and updates the server information 1600.

The replication information update module 1540 is executed by the CPU 40 of the management server 1230 in response to a replication information update instruction from a distributed file system administrator (hereinafter referred to as the administrator) and updates replication information 1700 on the basis of a replication source server ID and a replication destination server ID specified by the administrator.

The server information 1600 is information indicating a relationship among the server 1220, a file and a site.

The replication information 1700 holds information about servers 1220 that are to hold identical data. In a write process, the client program 1300 transfers a request for a write identical to a write to a master to one or more replication target servers 1220 synchronously or asynchronously. Specifically, for example, the write process module 1320 of the client program 1300 first transfers the write query described above to the save destination determining module 1510. The save destination determining module 1510 determines to which server a file specified in the write query is to be replicated, on the basis of information such as the replication information 1700, and returns the result of the determination to the write process module 1320. Then, based on the result of the query, the write process module 1320 transfers the request for write identical to the write to the master synchronously or asynchronously to the one or more replication target servers 1220.

The file information 1800 holds information about each file handled by the distributed file system. As will be described later, the file information 1800 includes the file size of each file, server IDs of servers that hold the files, and lists of replication destination server IDs. In a recovery process, the site determining module 1520 determines a restore destination site with which recovery will be completed in the shortest time, on the basis of file information 1800, server information 1600 and inter-site communication speed information 600.

FIG. 16 is a diagram illustrating a configuration example of server information 1600.

The server information 1600 is a table, for example, and includes an entry for each server. Each entry stores information such as a server ID 1610, a minimum hash value 1620, a maximum hash value 1630, a site ID 1640 and a server type 1650. One server 1220 (a "target server 1220" in the description of FIG. 16) is taken as an example in the following description.

The server ID 1610 is an ID for identifying a target server 1220. The minimum hash value 1620 is the minimum values of hash of filenames of files to be held by the target server. The maximum hash value 1630 is the maximum value of a hash of the filename of the file to be held by the target server. The site ID 1640 is an ID for identifying a site to which the target server 1220 belongs. The server type 1650 is the type of the target server 1220 (for example "master" or "replica").

The minimum hash value 1620 and the maximum hash value 1630 are intended to allow a file having a filename hash value that falls between the minimum hash value 1620 and the maximum hash value 1630 is to be saved on the target server 1220. In response to a layout information update instruction from the administrator the layout information update module 1530 obtains a range of hash values of the filenames of files to be held by each of one or more servers 1220 associated with the server type "master" and updates the minimum hash value 1620 and the maximum hash value 1630 in the server information 1600.

FIG. 17 is a diagram illustrating a configuration example of replication information.

The replication information 1700 is a table, for example, and includes an entry for each replication. Each entry stores information such as a replication source server ID 1710 and a replication destination server ID 1720. One replication (a "target replication" in the description of FIG. 17) is taken as an example in the following description.

The replication source server ID 1710 is an ID of a replication source server for a target replication. The replication destination server ID 1720 is an ID of a replication destination server for the target replication. Note that one or a plurality of server IDs may be stored as replication destination server IDs 1720.

The replication information 1700 is updated by the replication information update module 1540 in response to a replication information update instruction from the administrator. The administrator determines the number of server IDs to be specified as replication destination server IDs 1720, for example, on the basis of requirements such as a requirement concerning the redundancy of data held by the distribution file system and transfers the update instruction mentioned above in which parameters such as the number of server IDs to the replication information update module 1540 is specified.

FIG. 18 is a diagram illustrating a configuration example of file information.

The file information 1800 is a table, for example, and includes an entry for each file. Each entry stores information such as a filename 1810, a file size 1820, a master server ID 1830, and a replication destination server ID list 1840. One file (a "target file" in the description of FIG. 18) is taken as an example in the following description.

The filename 1810 is the filename of a target file. The file size 1820 indicates the size of the target file. The master server ID 1830 is an ID of a master server (a server with the server type 1650 "master") in which the target file is saved. The replication destination server ID list 1840 is a list of IDs of replication destination servers for the target file. The number of server IDs included in the replication destination server ID list 1840 may be determined in accordance with the degree of importance of the target server (for example a value determined by a file identifier, the frequency of updates, and a file size).

When the file write module 1420 of the distribution program 1400 receives a write request or a write request for replication from the write process module 1320 of the client program 1300, an entry in the file information 1800 is created or updated by the file write module 1420.

Figure 19:
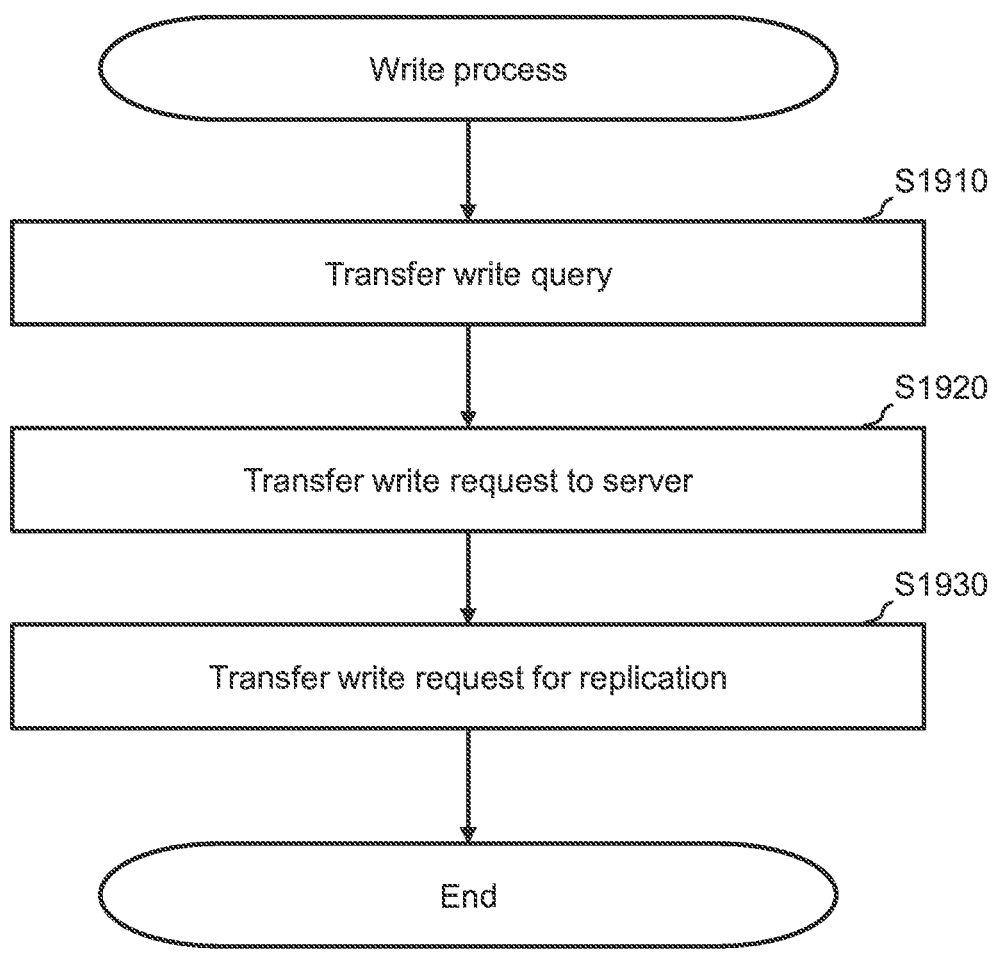
FIG. 19 is a flowchart illustrating an example of a write process according to the second embodiment.

FIG. 19 is an example flowchart of a write process.

First, the write process module 1320 transfers a write query to the save destination determining module 1510 of the management program 1500 (S1910). Specifically, for example, the write process module 1320 transfers a write query in which the filename of a file to be written is specified to the save destination determining module 1510 and receives a write server ID (the server ID of a server to which the write is to be performed) and a server ID for replication (the server ID of a server to which a write for replication is to be performed) from the save destination determining module 1510.

Then, the write process module 1320 transfers a write request for the file to be written to the server 1220 associated with the write server ID acquired in S1910 (S1920). The write request is processed by the file write module 1420 of the distribution program 1400.

Lastly, the write process module 1320 sends a write request for replication to the server 1220 associated with the replication server ID acquired in S1910 (S1930). The write request for replication is processed by the file write module 1420 of the distribution program 1400. S1930 may be performed asynchronously.

Figure 20:
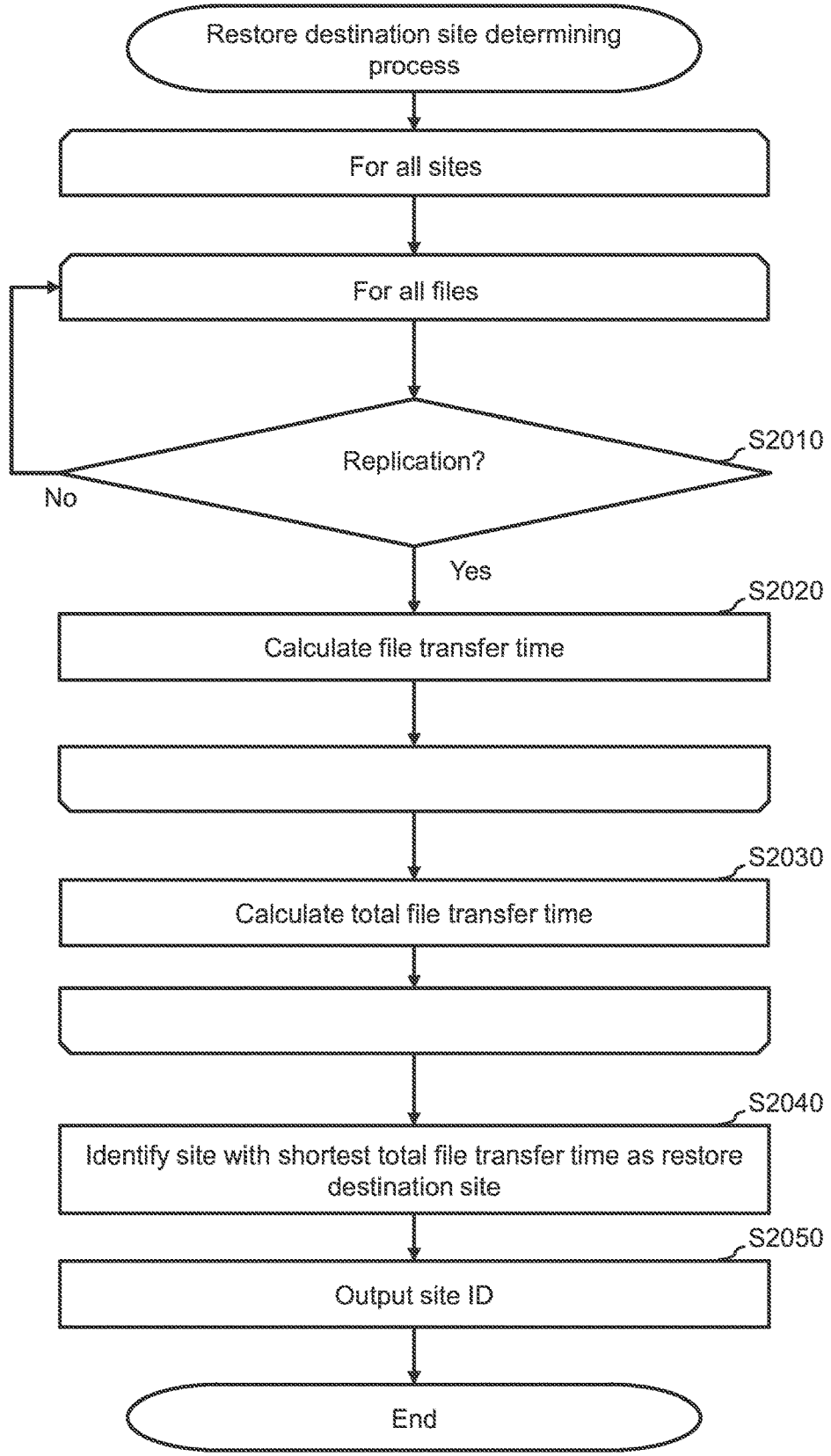
FIG. 20 is a flowchart illustrating an example of a restore destination site determining process according to the second embodiment.

FIG. 20 is an example flowchart of a restore destination site determining process. The restore destination site determining process is executed in response to a request from the recovery process module 310 but may be executed in response to an instruction from the administrator in order to consult about a restore destination site.

The site determining module 1520 performs S2010 through S2030 for all sites 101. One site (a "target site" in the description of FIG. 20) is taken as an example in the following description.

Then, the site determining module 1520 performs S2010 and S2020 for all files. One file (a "target file" in the description of FIG. 20) is taken as an example in the following description.

The site determining module 1520 determines whether or not a target file is a file to be replicated (S2010). If the master server ID 1830 associated with the target file is a server ID of a failed server, the result of the determination in S2010 will be true.

If the result of the determination in S2010 is true (S2010: YES), the site determining module 1520 calculates file transfer time of the target file on the basis of inter-site communication speed information 600, server information 1600 and file information 1800 (S2020). Specifically, the site determining module 1520 performs the following process, for example.

The site determimning module 1520 identifies one or more replication destination server IDs included in the replication destination server ID list 1840 associated with the target file.

The site determining module 1520 identifies one or more sites (the "replication destination sites" in the description of FIG. 20) associated with the one or more identified replication destination server IDs from the server information 1600.

For each of the one or more replication destination sites, the site determining module 1520 identifies communication speed between the target site and the replication destination site from the inter-site communication speed information 600. As a result, one or more communication speeds associated with the respective one or more replication destination sites are identified.

The site determining module 1520 determines file transfer time on the basis of the identified one or more communication speeds and the file size 1820 associated with the target file. Specifically, for example, the site determining module 1520 divides the file size 1820 associated with the target file by the fastest communication speed among the one or more communication speeds, thereby determining the shortest transfer time as the file transfer time.

In this way, file transfer times are calculated for all files. The site determining module 1520 calculates the total file transfer time that is the sum of the file transfer times of all files (S2030).

In this way, the total file transfer time is calculated for all sites.

Then, the site determining module 1520 identifies the shortest total file transfer time, which is one example of any one of the total file transfer times, and obtains a site corresponding to the identified total file transfer time (S2040).

Lastly, the site determining module 1520 outputs the site ID obtained in S2040 (S2050).

A process procedure of a restore destination site determining process will be described below using the specific example in FIGS. 6, 16, 17 and 18. It is assumed in this example that a server 1002 (the server with a server ID of "1002") is a failed server.

First, the site determining module 1520 obtains the total file transfer time for each of all sites (the time required for acquiring all files held by the failed server when a restore destination server is created at the site). Sites 6001 to 6008 exist in the example and the site determining modules 1520 first obtains the total file transfer time required when a restore destination server is provided at the site 6001. The site determining module 1520 scans the entries in the file information 1800 to determine whether or not a master server ID is "1002" (S2010). In the example, the master server ID associated with filename "d.tar" is "1002". The file "d.tar" (the file with the filename "d.tar") has been replicated to servers 1005 and 1006. According to the server information 1600, the server 1005 and the server 1006 belong to sites 6005 and 6006, respectively. The communication speed between the site 6001 and the site 6005 is 2 MB/s and the communication speed between the site 6001 and the site 6006 is 1 MB/s. Therefore, in order to acquire the file "d.tar" faster, the site determining module 1520 decides to acquire the file "d.tar" from the server 1005 at the site 6005 and divides the file size "20 MB" of the file "d.tar" by a communication speed of "2 MB/s" to obtain a file transfer time of "10 seconds" (S2020).

The site determining module 1520 performs a similar process for all files and calculates the total file transfer time required when the restore detention server is provided at the site 6001 (S2030).

The site determining module 1520 performs a similar process for the other sites 6002 to 6008. Then, the site determining module 1520 identifies a site that has the shortest total file transfer time as the restore destination site from the sites 6001 to 6008 and outputs the site ID of the identified site (S2040).

As has been described above, according to the embodiment, a site that has the shortest total file transfer time is determined as a restore destination site on the basis of file information 1800, server information 1600, and inter-site communication speed information 600. Accordingly, the time required for recovery for ensuring high data availability in a distributed file system in which data is distributed and saved among a plurality of servers and data distribution among the servers is imbalanced due to, for example, the way to select a server 1220 during replication can be reduced. Since the time required for recovery is reduced, the period of time during which the read/write process performance of the distributed file system decreases can be reduced.

The foregoing description will be summarized below. Items that are not in the foregoing description may be included in the summation. Note that in the following summation, examples of a dataset are the blockchain data and files described above. Further, examples of nodes are the servers. Examples of a distributed computing system are the blockchain system and the distribution file system. Examples of a management program are the blockchain management program 300 and the management program 1500.

The management program is executed at least on one node or a different computer in the distributed computing system. The management program
(A) identifies one or more sites at which one or more nodes exist that hold one or more datasets identical to one or more datasets held by a node to be recovered (for example a failed node) among a plurality of nodes, and
(B) determines a restore destination site which is a site of a node to which the one or more identical datasets are to be restored from among a plurality of sites on the basis of the identified one or more sites.

Since the restore destination site is determined on the basis of one or more sites at which the one or more identical datasets exist, the time required for restore (transfer) of the one or more identical datasets can be reduced.

The restore destination site may be determined on the basis of the communication speed between each of a plurality of sites and each of one or more restore source sites. For each of the one or more identical datasets, each of the one or more restore source sites may be (x) or (y) given below:
(x) a site at which a node that holds the dataset(s) exists, or
(y) any of one or more candidate sites that are sites at which one or more nodes that hold the dataset(s) exist.

Since the restore destination site is determined on the basis of communication speed, the certainty that the time required for restore (transfer) is reduced can be increased. While communication speed between sites is expressed in general by the amount of data that can be transferred per unit time, the communication speed may be expressed by the distance between the sites. In this case, it can be considered that the longer the distance, the lower the communication speed.

The restore destination site may be a site that has the highest total of one or more communication speeds each of which corresponds to one or more identified sites among a plurality of sites. This can further reduce the time required for restore. Note that if the communication speed between sites is expressed by the distance between the sites, a "site that has the highest total of one or more communication speeds" may be a "site that has the smallest total of one or more distances".

(y) given above may be a site that has the highest communication speed out of one or more candidate sites. This can further reduce the time required for restore.

The restore destination site may be chosen on the basis of the data size of each of one or more datasets in addition to the communication speed between each of a plurality of sites and each of one or more restore source site. It takes a long time to complete transfer of a dataset to be transferred that has a large data size even if the communication speed is fast. By taking into consideration data size as well, the certainty that the time required for restore is reduced can be increased.

The restore destination site may be determined on the basis of the total data transfer time to each of a plurality of sites. The total data transfer time to each of a plurality of sites may be the sum of one or more transfer times corresponding to the one or more identical datasets. For each of a plurality of sites and for each of one or more datasets, the total data transfer time may be based on the communication speed between the site and a restore source site that holds the dataset and on the data size of the dataset. Since the restore destination site is determined on the basis of the total data transfer time, the certainty that the time required for restore is reduced can be increased.

the restore destination site may be a site that has the shortest total data transfer time among a plurality of sites. This can further reduce the time required for restore.

(y) may be a site that has the shortest transfer time out of one or more candidate sites. This can further reduce the time required for restore.

The plurality of sites may be one or more identified sites. Since this can narrow down the range (the number of sites) to be searched for a restore destination site on the basis of communication speed, the restore destination site can be chosen fast.

The restore destination site may be any of one or more identified sites. This allows the restore destination site to be chosen (on the basis of the distribution of the one or more identical datasets) without taking into consideration communication speed and data size and therefore the restore destination site can be determined fast.

For each of one or more datasets, each of one or more servers that hold a dataset identical to the dataset may be a server that belongs to a range that shares data in the dataset with a server to be recovered. That is, the range of distribution can be controlled for each dataset.

The one or more identified sites may be sites at which one or more servers to which one or more datasets are replicated for the recovery target server exist. That is, the range of distribution (specifically, a master server and a replication destination server, for example) can be controlled for each dataset.

While some embodiments have been described above, the embodiments are illustrative for explaining the present invention and are not intended to limit the scope of the present invention to the embodiments. The present invention can be implemented in various other modes.

For example, a computer system may exist at each of a plurality of sites that are geographically distant from one another. A "computer system" includes one or more physical computers. At least one physical computer may run a virtual computer (for example a virtual machine (VM)) or a software-defined anything (SDx). As an SDx, a software defined storage (SDS) (an example of a virtual storage apparatus) or a software-defined datacenter (SDDC) may be used. A computer may be a storage apparatus. A computer system may be a cloud computing system.

What is claimed is:

1. A non-transitory computer readable medium in a distributed computing system including a plurality of computers existing at a plurality of sites, wherein in the distributed computing system, datasets are distributed and held in the plurality of computers existing at the plurality of sites, the non-transitory computer readable medium comprising a program having instructions that when executed by at least one processor, when a failure occurs in one site of the plurality of sites, perform the steps of:
identifying a dataset of one computer at the one site that needs to be restored;
identifying other sites at which other computers hold datasets corresponding to the dataset at the one site that needs to be restored;
computing a transfer time based on a communication speed between the sites and a data size of the dataset to be restored so as to determine a restore destination site; and
selecting the restore destination site from the other sites based on the computed transfer time,
wherein for each of the datasets, the sites that store a corresponding dataset have computers that must belong to a predetermined data sharing range with a computer that stores the respective dataset,
wherein, for the identified data set, the identified other sites are sites that must be within the data sharing range of the one computer,
wherein the selected restore destination site is selected from the other sites that have the computers that are within the data sharing range of the one computer based on the computed transfer time,
wherein the selected restore destination site is a site that has a shortest total data transfer time among the other sites including the selected restore destination site, and
wherein for each of the other sites including the selected restore destination site, the total data transfer time is a sum of one or more transfer times that correspond to the dataset.

2. The non-transitory computer readable medium according to claim 1,
wherein the selected restore destination site is a site that has a fastest communication speed among the other sites including the selected restore destination site.

3. At least one computer in a distributed computing system including a plurality of computers existing at a plurality of sites when a failure occurs in one site of the plurality of sites, wherein in the distributed computing system, datasets are distributed and held in the plurality of computers existing at the plurality of sites, comprising:
an interface unit including one or more interface devices for communication with one or more of the plurality of computers; and
a processor unit including one or more processors coupled to the interface unit wherein the processor unit is configured to:
identify a dataset at the one site that needs to be restored;
identify other sites at which other computers hold datasets corresponding to the dataset at the one site that needs to be restored;
compute a transfer time based on a communication speed between the sites and a data size of the dataset to be restored so as to determine a restore destination site; and
select the restore destination site from the other sites based on the computed transfer time,
wherein for each of the datasets, the sites that store a corresponding dataset have computers that must belong to a predetermined data sharing range with a computer that stores the respective dataset,
wherein, for the identified data set, the identified other sites are sites that must be within the data sharing range of the one computer,
wherein the selected restore destination site is selected from the other sites that have the computers that are within the data sharing range of the one computer based on the computed transfer time,
wherein the selected restore destination site is a site that has a shortest total data transfer time among the other sites including the selected restore destination site, and
wherein for each of the other sites including the selected restore destination site, the total data transfer time is a sum of one or more transfer times that correspond to the dataset.

4. A method for recovering a computer to be recovered in a distributed computing system including a plurality of computers existing at a plurality of sites when a failure occurs in one site of the plurality of sites, wherein in the distributed computing system, datasets are distributed and held in the plurality of computers existing at the plurality of sites, the method comprising:
identifying a dataset at the one site that needs to be restored;
identifying other sites at which other computers hold datasets corresponding to the dataset at the one site that needs to be restored;
computing a transfer time based on a communication speed between the sites and a data size of the dataset to be restored so as to determine a restore destination site; and
selecting the restore destination site from the other sites based on the computed transfer time,
wherein for each of the datasets, the sites that store a corresponding dataset have computers that must belong to a predetermined data sharing range with a computer that stores the respective dataset,
wherein, for the identified data set, the identified other sites are sites that must be within the data sharing range of the one computer,
wherein the selected restore destination site is selected from the other sites that have the computers that are within the data sharing range of the one computer based on the computed transfer time,
wherein the selected restore destination site is a site that has a shortest total data transfer time among the other sites including the selected restore destination site, and
wherein for each of the other sites including the selected restore destination site, the total data transfer time is a sum of one or more transfer times that correspond to the dataset.

* * * * *